(12) United States Patent
Daurensan

(10) Patent No.: US 7,373,153 B2
(45) Date of Patent: May 13, 2008

(54) METHOD OF LOCATING A MOBILE TERMINAL WITH ITS POSITION BEING DISPLAYED ON ANOTHER MOBILE TERMINAL

(75) Inventor: Véronique Daurensan, Antony (FR)

(73) Assignee: Alcatel, Paris (FR)

( * ) Notice: Subject to any disclaimer, the term of this patent is extended or adjusted under 35 U.S.C. 154(b) by 462 days.

(21) Appl. No.: 11/196,443

(22) Filed: Aug. 4, 2005

(65) Prior Publication Data

US 2006/0040680 A1 Feb. 23, 2006

(30) Foreign Application Priority Data

Aug. 5, 2004 (FR) .................................. 04 08658

(51) Int. Cl.
*H04Q 7/20* (2006.01)
(52) U.S. Cl. ............... 455/456.1; 455/456.2; 455/456.3; 455/456.6; 455/457; 455/418
(58) Field of Classification Search ............ 455/456.1, 455/456.2, 456.3, 456.6, 457, 418, 419, 420, 455/421, 422.1; 342/457
See application file for complete search history.

(56) References Cited

U.S. PATENT DOCUMENTS

| | | | |
|---|---|---|---|
| 6,243,039 B1 * | 6/2001 | Elliot | 342/457 |
| 6,609,006 B1 * | 8/2003 | Mori | 455/466 |
| 6,716,101 B1 | 4/2004 | Meadows | |
| 2001/0052849 A1 | 12/2001 | Jones | |
| 2003/0134648 A1 * | 7/2003 | Reed et al. | 455/456 |
| 2005/0096069 A1 * | 5/2005 | Lee | 455/456.5 |
| 2006/0205416 A1 * | 9/2006 | Kayzar et al. | 455/456.1 |
| 2006/0223528 A1 * | 10/2006 | Smith | 455/432.3 |

FOREIGN PATENT DOCUMENTS

GB 2 356 097 A 5/2001

* cited by examiner

*Primary Examiner*—Joseph Feild
*Assistant Examiner*—Huy D Nguyen
(74) *Attorney, Agent, or Firm*—Sughrue Mion, PLLC

(57) ABSTRACT

The invention relates to the field of methods of locating a mobile terminal and displaying its position on another mobile terminal.

The method comprises: a communications step between a first mobile terminal and a server, the first mobile terminal supplying the server with the number of a second mobile terminal; a definition step in which the first mobile terminal defines at least one permitted movement area on a map of a site; a locating step of locating the second mobile terminal; a display step of displaying on the screen of the first mobile terminal firstly at least a portion of the map, and secondly the position of the second mobile terminal on the map; the locating and display steps being updated over time; a sending step whereby the server sends a main alarm to the first mobile terminal when the second mobile terminal leaves the permitted area; and a sending step in which the server or the first mobile terminal sends a secondary alarm in the form of a voice message to the second mobile terminal when the second mobile terminal is leaving or has left the permitted area. The invention can be applied to enabling a parent to keep an eye on a child.

27 Claims, No Drawings

METHOD OF LOCATING A MOBILE TERMINAL WITH ITS POSITION BEING DISPLAYED ON ANOTHER MOBILE TERMINAL

The invention relates to the field of methods of locating a mobile terminal with its position being displayed on another mobile terminal. The invention also relates to an application server and to mobile terminals for implementing the method of the invention. The mobile terminals serve to transmit and receive voice messages; they are preferably mobile telephones.

In the prior art, it is known for a first mobile terminal to call a second mobile terminal to ask the second mobile terminal where it is located. A drawback is either that calls are made very often, which is tedious and usually pointless, or else that calls are made rarely and can thus be too late if a problem arises for the user of the second mobile terminal. Another drawback is that the user of the second mobile terminal, e.g. a very young child, might not be capable of describing a location sufficiently accurately to a parent calling to find out where the child is located.

In other prior art, e.g. as described in British patent GB 2 356 098, it is known to display the position of a first mobile terminal on a second mobile terminal and to send an alarm when the first mobile terminal leaves a permitted area. A drawback is that no provision is made for the user of the second mobile terminal to react and anticipate a problem that might arise for the user of the first mobile terminal after the user of the first mobile terminal has left the permitted area.

Other prior art relates to locating the user of a mobile terminal, including European patent application EP 1 359 431, European patent application EP 1 351 174, European patent application EP 1 130 888, Patent Abstracts of Japan JP 10 281 801, and US patent application US 2003/0201931.

The invention seeks to provide fast and effective reaction means for the user of a mobile terminal that has received an alarm when the user of the other mobile terminal whose behavior has caused the alarm leaves the permitted area.

The invention provides a method comprising: a communications step between a first mobile terminal and a server, the first mobile terminal supplying the server with the number of a second mobile terminal; a definition step in which the first mobile terminal defines at least one permitted movement area on a map of a site; a locating step of locating the second mobile terminal; a display step of displaying on the screen of the first mobile terminal firstly at least a portion of the map, and secondly the position of the second mobile terminal on the map; the locating and display steps being updated over time; a sending step whereby the server sends a main alarm to the first mobile terminal when the second mobile terminal leaves the permitted area; and a sending step in which the server or the first mobile terminal sends a secondary alarm in the form of a voice message to the second mobile terminal when the second mobile terminal is leaving or has left the permitted area.

The invention will be better understood and other features and advantages thereof will appear on reading the following description given by way of example.

The method of the invention comprises a plurality of steps, i.e. a communications step, a definition step, a locating step, a display step, and two sending steps, these steps not necessarily following one another successively and these steps not necessarily all being performed the same number of times whenever the method of the invention is run.

The communications step is a step of establishing communication between a first mobile terminal and a server, the first mobile terminal giving the server the number of a second mobile terminal. In the preferred but non-lilting example described below, the second mobile terminal is the mobile terminal of a child, while the first mobile terminal is the terminal of one of the child's parents. The first mobile terminal calls the server and gives the server the number of the second mobile terminal so that the server can locate the second mobile terminal and deliver said location to the first mobile terminal. This communications step can be initiated either by the first mobile terminal or by the server when the server can detect entry of the first mobile terminal, and possibly of a second mobile terminal associated with the first mobile terminal, into a site where the server can propose the method of the invention and when said method is likely to be of interest to the first mobile terminal, i.e. when the first mobile terminal is accompanied in the site by a second mobile terminal that is associated therewith, i.e. that the server knows is associated with the first mobile terminal: for example when a parent and a child enter an amusement park. Conversely, the server may propose the method of the invention to the first mobile terminal when the first mobile terminal is leaving the permitted movement area while the second mobile terminal is remaining within the permitted movement area: for example when a parent leaves a child at home.

The definition step is a step in which the first mobile terminal defines at least one permitted movement area on a map of a site. The server displays the map including the site on the screen of the first mobile terminal, and provides the first mobile terminal with means for selecting and defining on said map a permitted area which the second mobile terminal is supposed not to leave. The definition step may either be performed on each occasion, or may else be stored in memory and recalled, possibly automatically, if the site in question is a usual movement site for the first mobile terminal and for the second mobile terminal.

The locating step is a step of locating the second mobile terminal, preferably by the server. The server can make use of any available auxiliary service for such locating purposes, such as base stations, beacons, or other devices. The server does not require active help from the second mobile terminal as in some of the prior art, it suffices for the second mobile terminal to be switched on, i.e. the second mobile terminal could merely be on standby, for example. The second mobile terminal may also be fitted with a global positioning system (GPS) receiver, for example.

The display step is a step of displaying on the screen of the first mobile terminal firstly at least a portion of the map and secondly the position of the second mobile terminal on the map. The server displays at least a portion of the map of the site in which the second mobile terminal is moving on the screen of the first mobile terminal together with the position of the second mobile terminal on said portion of the map so as to enable the user of the first mobile terminal to know where to find the user of the second mobile terminal merely by glancing at the screen of the first mobile terminal.

The locating and display steps are updated over time so that the user of the first mobile terminal can track the movement over time of the user of the second mobile terminal. This updating may be periodic, for example, with the length of the period possibly depending both on the travel speed of the user of the second mobile terminal and on the size of the permitted movement area for the user of the second mobile terminal. While the locating and display steps are taking place, a new definition step can take place, for example if the parent or the child are changing place within the site in which they are moving.

One of the sending steps is a step of the server sending a main alarm to the first mobile terminal when the second mobile terminal leaves the permitted area. This alarm is important, since if parents need this service corresponding to the method of the invention, that is specifically because they cannot keep their eyes constantly on their children, for example they might want to read or talk with some other person. A parent must therefore be warned as soon as possible when a child leaves the permitted movement area, so as to divert the parent's attention from an occupation in which the parent might be absorbed; by way of example, the alarm may be of the ring tone type, or it could be of the short message service (SMS) type, but that is less effective.

The other sending step is a step of the server or the first mobile terminal sending a secondary alarm in the form of a voice message to the second mobile terminal when the second mobile terminal is leaving or has left the permitted area. To counter potential danger for the user of the second mobile terminal, e.g. a child going towards a swimming pool on leaving the permitted area constituted by the lawn in a garden, a voice message is sent to the second mobile terminal to assist the user of the second mobile terminal in handling the situation, with the voice message containing, for example, one or more instructions or pieces of advice that can easily be understood even by a very young child. The secondary alarm is preferably sent as soon as the second mobile terminal leaves the permitted area, but there may also be a time delay so as to avoid too many false alarms if the user of the second mobile terminal is moving along the boundary of the permitted movement area: for example the main alarm is sent only if the second mobile terminal has left the permitted area for more than five consecutive seconds.

The voice message may be sent to the second mobile terminal either by the server or by the first mobile terminal, and this can be done in several manners. In one of these manners, the secondary alarm comprises putting the first mobile terminal into voice communication with the second mobile terminal; thus, the user of the first mobile terminal can send directly the voice message that seems the most appropriate to the user of the second mobile terminal, given the position displayed on the map: for example "don't move", "wait for Daddy to come and pick you up", "get away from the pool" . . . . Naturally, one of these messages or a general default message of the "don't move" or "come back" type could be prerecorded either in the first mobile terminal or in the server, or even in the second mobile terminal so as to be activated by the first mobile terminal or by the server, with all of this taking place without the intervention of the user of the first mobile terminal when a prerecorded message is used. By way of example, the prerecorded message may also be of the reprimand type such as "go back to your bedroom, you are still being kept in" or even associated with a time delay, e.g. "you've been watching TV for more than an hour now, go play in your bedroom".

Preferably, the server locates the second mobile terminal by triangulation. Advantageously, the triangulation is performed between beacons disposed in the site, in which case these can be beacons dedicated to implementing the method of the invention, for example. Advantageously, the density of the beacons is sufficient to enable the second mobile terminal to be located to within better than 10 meters, or preferably to within better than 5 meters. The terminal may also be located using universal mobile telephone system (UMTS) stations, in particular when the mobile terminals are themselves third-generation terminals. The second mobile terminal and the first mobile terminal may also each be provided with a GPS receiver, for example, and thus determine their own locations without any help from the server offering the method of the invention. It is also possible to switch from one locating technique (e.g. using UMTS stations) to another locating technique (e.g. using GPS) depending on circumstances, e.g. on site.

In an advantageous option, the second mobile terminal includes a trigger which, on being activated by the user of the second mobile terminal, leads to the step of sending the main alarm being implemented, even if the second mobile terminal has not left the permitted area. This is provided for the circumstance in which the child encounters a problem even within the permitted moment area, e.g. if the child is lost within the permitted movement area. Advantageously, activating the trigger automatically puts the first mobile terminal into communication with the second mobile terminal. Thus, the parent can immediately ask the child why the trigger has been triggered and deal with the problem directly by voice. The trigger may correspond to the user of the second mobile terminal pressing one or more particular keys, or to the user of the second mobile terminal pressing any key.

In a preferred embodiment, the map is subdivided into regions, and the permitted area is defined by using the first mobile terminal to confirm some of the regions. Preferably, the server displays one or more regions on the screen of the first mobile terminal and some or all of the regions can then be confirmed by a single click or by a plurality of single clicks, e.g. by a plurality of single presses on a key. In the limit, just one region is confirmed by a single click, so that the definition step corresponds merely to an approval step. It is also possible to allow the user of the first mobile terminal to draw the permitted movement area on the map, but although that enables the area to be personalized, it can nevertheless be time consuming. The permitted movement area may corresponding to an outer perimeter, itself containing forbidden places that therefore do not belong to the permitted movement area. By way of example, such a place could be a place that is dangerous for children, such as a swimming pool, while the outer perimeter is the garden fence, so the permitted area is consequently the garden not including the pool.

In another preferred embodiment, the permitted movement area is dynamic and corresponds to a perimeter around the position of the first mobile terminal. For example a radius of 20 meters around the first mobile terminal. Under such circumstances, when the first mobile terminal moves, the permitted movement area moves likewise and the second mobile terminal may leave the permitted movement area even though it has not itself moved: for example a child left behind in a park while the parent walks on.

The main alarm is preferably a ring tone and not an SMS type message so as to ensure that it will be noticed by the user of the first mobile terminal, even when otherwise engaged or absorbed in some activity.

Preferably, the server automatically proposes implementing the method to the first mobile terminal as soon as the first mobile terminal enters into the site. Thus, the parent does not need to remember to activate the service with the server, and the server proposes it by default as soon as the parent and the child enter the park, for example, with this corresponding to the first and second mobile terminals both entering the park. Under such circumstances, the communications step amounts to no more than approval by the user of the first mobile terminal, with the number of the second mobile terminal having been given once and for all initially; it can still be modified subsequently.

Preferably, the location is an amusement park. Amusement parks are large and crowded on busy days: it is therefore easy for a parent to lose a child therein.

Preferably, the step of displaying the position of the second mobile terminal also gives the direction in which the second mobile terminal is traveling. For example this direction may be indicated in the form of an arrow on the map. Thus, a parent seeing that the child is close to a dangerous place can also see whether the child is moving towards it or on the contrary away from it. Advantageously, the display step also displays the position of the first mobile terminal. This makes it even easier for the user of the first mobile terminal to identify the position of the second mobile terminal on the map given that the user can see simultaneously the positions of both the first and second mobile terminals on the map.

What is claimed is:

1. A method comprising:
    a communications step between a first mobile terminal and a server, the first mobile terminal supplying the server with the number of a second mobile terminal;
    a definition step in which the first mobile terminal defines at least one permitted movement area on a map of a site;
    a locating step of locating the second mobile terminal;
    a display step of displaying on the screen of the first mobile terminal firstly at least a portion of the map, and secondly the position of the second mobile terminal on the map;
    the locating and display steps being updated over time;
    a sending step whereby the server sends a main alarm to the first mobile terminal when the second mobile terminal leaves the permitted area; and
    a sending step in which the server or the first mobile terminal sends a secondary alarm in the form of a voice message to the second mobile terminal when the second mobile terminal is leaving or has left the permitted area.

2. A method according to claim 1, characterized in that the secondary alarm is a prerecorded voice message.

3. A method according to claim 2, characterized in that the server locates the second mobile terminal by triangulation.

4. A method according to claim 2, characterized in that the second mobile terminal includes a trigger, which on being activated by the user of the second mobile terminal, leads to a step of sending the main alarm even if the second mobile terminal has not left the permitted area.

5. A method according to claim 2, characterized in that for a map that is subdivided into regions, the permitted area is defined by confirming a fraction of the regions by using the first mobile terminal.

6. A method according to claim 1, characterized in that the secondary alarm comprises putting the first mobile terminal into voice communication with the second mobile terminal.

7. A method according to claim 6, characterized in that the server locates the second mobile terminal by triangulation.

8. A method according to claim 6, characterized in that the second mobile terminal includes a trigger, which on being activated by the user of the second mobile terminal, leads to a step of sending the main alarm even if the second mobile terminal has not left the permitted area.

9. A method according to claim 6, characterized in that for a map that is subdivided into regions, the permitted area is defined by confirming a fraction of the regions by using the first mobile terminal.

10. A method according to claim 1, characterized in that the server locates the second mobile terminal by triangulation.

11. A method according to claim 10, characterized in that the server locates the second mobile terminal by triangulation between beacons disposed in the site.

12. A method according to claim 11, characterized in that the density of the beacons is sufficient for the second mobile terminal to be located with accuracy to within better than 10 meters.

13. A method according to claim 12, characterized in that the density of beacons is sufficient for the second mobile terminal to be located with accuracy to within better than 5 meters.

14. A method according to claim 10, characterized in that the second mobile terminal includes a trigger, which on being activated by the user of the second mobile terminal, leads to a step of sending the main alarm even if the second mobile terminal has not left the permitted area.

15. A method according to claim 10, characterized in that for a map that is subdivided into regions, the permitted area is defined by confirming a fraction of the regions by using the first mobile terminal.

16. A method according to claim 1, characterized in that the second mobile terminal includes a trigger, which on being activated by the user of the second mobile terminal, leads to a step of sending the main alarm even if the second mobile terminal has not left the permitted area.

17. A method according to claim 16, characterized in that activation of the trigger automatically leads to the first mobile terminal being put into communication with the second mobile terminal.

18. A method according to claim 1, characterized in that for a map that is subdivided into regions, the permitted area is defined by confirming a fraction of the regions by using the first mobile terminal.

19. A method according to claim 1, characterized in that the permitted area is dynamic and corresponds to a perimeter around the position of the first mobile terminal.

20. A method according to claim 1, characterized in that in that the main alarm is a ring tone.

21. A method according to claim 1, characterized in that the server automatically proposes implementing the method to the first mobile terminal as soon as the first mobile terminal enters into the site.

22. A method according to claim 1, characterized in that the site is an amusement park.

23. A method according to claim 1, characterized in that the locating is performed by the server using UMTS stations.

24. A method according to claim 1, characterized in that the step of displaying the position of the second mobile terminal also indicates the travel direction of the second mobile terminal.

25. A method according to claim 1, characterized in that the display step also displays the position of the first mobile terminal.

26. A mobile terminal for implementing the method according to claim 1.

27. A server for implementing the method according to claim 1.

* * * * *